(12) United States Patent
Matsumoto et al.

(10) Patent No.: US 12,420,594 B2
(45) Date of Patent: Sep. 23, 2025

(54) PNEUMATIC TIRE

(71) Applicant: BRIDGESTONE CORPORATION, Tokyo (JP)

(72) Inventors: Hiroyuki Matsumoto, Tokyo (JP); Yoshio Kaji, Tokyo (JP); Hiroshi Nomura, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 18/693,947

(22) PCT Filed: May 12, 2022

(86) PCT No.: PCT/JP2022/020117
§ 371 (c)(1),
(2) Date: Mar. 21, 2024

(87) PCT Pub. No.: WO2023/074028
PCT Pub. Date: May 4, 2023

(65) Prior Publication Data
US 2024/0383283 A1  Nov. 21, 2024

(30) Foreign Application Priority Data

Oct. 28, 2021  (JP) .................................. 2021-176994

(51) Int. Cl.
*B60C 11/12* (2006.01)
(52) U.S. Cl.
CPC ... *B60C 11/1236* (2013.01); *B60C 2011/1254* (2013.01); *B60C 2011/129* (2013.01)

(58) Field of Classification Search
CPC ......... B60C 11/1236; B60C 2011/1259; B60C 2011/129
See application file for complete search history.

(56) References Cited

U.S. PATENT DOCUMENTS

2012/0305155 A1* 12/2012 Hamanaka .......... B60C 11/1204
 152/209.18
2014/0318677 A1* 10/2014 Kaneko ............... B60C 11/1204
 152/209.18

FOREIGN PATENT DOCUMENTS

| EP | 2862729 A1 | 4/2015 |
|---|---|---|
| JP | 08080232 A | * 3/1996 |
| JP | H0880232 A | 3/1996 |
| JP | 2000289413 A | 10/2000 |
| JP | 2002187413 A | 7/2002 |
| JP | 2002347413 A | 12/2002 |
| JP | 2005186827 A | 7/2005 |
| JP | 2006007793 A | 1/2006 |
| JP | 2008068647 A | 3/2008 |
| JP | 2012076718 A | 4/2012 |

(Continued)

OTHER PUBLICATIONS

English machine translation of JPH08-080232. (Year: 1996).*
(Continued)

*Primary Examiner* — Robert C Dye
(74) *Attorney, Agent, or Firm* — KENJA IP LAW PC

(57) ABSTRACT

Provided is a pneumatic tire in which sipe units with minute sipes are repeatedly arranged in a land portion; at least one end in an extending direction of the minute sipe of at least one of the minute sipes terminates within the land portion; w1(w2)×h is 150 (mm²) or less, and a sipe density is 0.15 (1/mm) or more.

9 Claims, 16 Drawing Sheets

(56) References Cited

FOREIGN PATENT DOCUMENTS

| | | | |
|---|---|---|---|
| JP | 2015178337 | A | 10/2015 |
| JP | 2018095073 | A | 6/2018 |
| JP | 2021165110 | A | 10/2021 |
| WO | 2007142073 | A1 | 12/2007 |
| WO | 2011141281 | A1 | 11/2011 |
| WO | 2013047691 | A1 | 4/2013 |

OTHER PUBLICATIONS

Jul. 26, 2022, International Search Report issued in the International Patent Application No. PCT/JP2022/020117.

Apr. 30, 2024, International Preliminary Report on Patentability issued in the International Patent Application No. PCT/JP2022/020117.

Dec. 18, 2024, search result of the Extended European Search Report issued by the European Patent Office in the corresponding European Patent Application No. 22886365.0.

* cited by examiner

FIG. 8

| | Comparative Example 1 | Comparative Example 2 | Example 1 | Example 2 | Example 3 | Example 4 |
|---|---|---|---|---|---|---|
| Sipe shapes | | | | | | |
| Average sipe spacing | 6mm | 3.75mm | 5.5mm | 6mm | 4.74mm | 3.3mm |
| Sipe density | 0.167/mm | 0.267/mm | 0.182/mm | 0.167/mm | 0.211/mm | 0.3/mm |
| Number of sipes | 4 | 7 | 4.33 | Equivalent to 4 | Equivalent to 5.33 | Equivalent to 8 |

PNEUMATIC TIRE

TECHNICAL FIELD

This disclosure relates to a pneumatic tire.

BACKGROUND

Conventionally, the land portion in the tread portion of pneumatic tires, especially of studless tires, has been provided with narrow grooves called sipes to improve on-ice gripping performance. The sipes allow water that gushes onto the tire contact patch as the icy road surface melts to drain out of the contact patch, thereby improving the on-ice gripping performance.

The prior art proposed to dispose sipes at a high density while minimizing the reduction in rigidity of the land portion so that to improve the on-ice gripping performance (For example, Patent Document 1).

CITATION LIST

Patent Literature

PTL 1: JP 2005-186827 A1

SUMMARY

Technical Problem

However, the art in Patent Document 1 was not sufficient to balance the rigidity of the land portion and the water drainage by the sipes, and there was room for improvement in improving on-ice gripping performance.

It is therefore an object of the present disclosure to provide a pneumatic tire with improved on-ice gripping performance.

Solution to Problem

The gist structure of the present disclosure is as follows.
(1) A pneumatic tire having at least one land portion in a tread surface, wherein
a plurality of minute sipes are disposed on at least one of the land portions,
the minute sipes are connected to each other to form a connected sipe,
the connected sipes constitute a sipe unit, and the sipe units are repeatedly arranged on the land portion,
at least one end in an extending direction of the minute sipe of at least one of the minute sipes terminates within the land portion,
when a length in the tire width direction of the connected sipe is w1 (mm) and a depth of the minute sipe is h (mm), w1×h is 150 (mm$^2$) or less, and
when a number of the connected sipes in the land portion is n, a maximum width in the tire width direction of the land portion is BW (mm), an equivalent length in the tire circumferential direction of the land portion obtained by dividing an outer contour area of the land portion (mm$^2$) by BW is BL (mm), a number of equivalent sipes N is defined as w1×n/BW, an average sipe spacing in the tire circumferential direction is expressed as BL/(N+1), and a sipe density SD is expressed as reciprocal of the average sipe spacing in the tire circumferential direction as SD=(N+1)/BL= ((w1×n/BW)+1)/BL, SD is 0.15 (1/mm) or more.

Here, the "tread surface" refers to the outer circumferential surface of the pneumatic tire that is in contact with the road surface when the pneumatic tire is assembled on an applicable rim, filled with prescribed internal pressure, and rolled under a maximum load.

In addition, the "sipe" means the one whose sipe width is 1 mm or less in the area of 50% or more of its sipe depth when the tire is assembled on the applicable rim, filled with the prescribed internal pressure, and unloaded. Here, the sipe depth is measured perpendicular to the tread surface in the above condition, and the sipe width is measured parallel to the tread surface in a cross section perpendicular to the extending direction of the sipe on the tread surface.

Note, that the number of connected sipes n, the maximum width in the tire width direction of the land portion BW, and the outer contour area of the land portion are the values measured in the expanded view of the tread surface. The "outer contour area" refers to the area enclosed by the outer contour in the expanded view of the tread surface, and therefore, even if non-ground portions such as sipes, small holes, narrow grooves, etc. are disposed within the land portion, the area does not exclude the area of the sipes, small holes, narrow grooves, etc.

As used herein, the "applicable rim" refers to the standard rim in the applicable size (Measuring Rim in ETRTO's STANDARDS MANUAL and Design Rim in TRA's YEAR BOOK) as described or as may be described in the future in the industrial standard, which is valid for the region in which the tire is produced and used, such as JATMA YEAR BOOK of JATMA (Japan Automobile Tyre Manufacturers Association) in Japan, STANDARDS MANUAL of ETRTO (The European Tyre and Rim Technical Organization) in Europe, and YEAR BOOK of TRA (The Tire and Rim Association, Inc.) in the United States (That is, the "rim" above includes current sizes as well as future sizes to be listed in the aforementioned industrial standards. An example of the "size as described in the future" could be the sizes listed as "FUTURE DEVELOPMENTS" in the ETRTO 2013 edition.). For sizes not listed in these industrial standards, the "applicable rim" refers to a rim with a width corresponding to the bead width of the tire. In addition, the "prescribed internal pressure" refers to the air pressure (maximum air pressure) corresponding to the maximum load capacity of a single wheel in the applicable size and ply rating, as described in the aforementioned JATMA, and others. In the case that the size is not listed in the aforementioned industrial standards, the "prescribed internal pressure" refers to the air pressure (maximum air pressure) corresponding to the maximum load capacity specified for each vehicle in which the tire is mounted. Further, the "maximum load" refers to the load corresponding to the above maximum load capacity.

(2) A pneumatic tire having at least one land portion in a tread surface, wherein
a plurality of minute sipes are disposed on at least one of the land portions,
the minute sipes spaced apart from each other constitute a sipe unit, and the sipe units are repeatedly arranged on the land portion,
at least one end in an extending direction of the minute sipe of at least one of the minute sipes terminates within the land portion,
when a length of the minute sipe in the tire width direction is w2 (mm) and a depth of the minute sipe is h (mm), w2×h is 150 (mm$^2$) or less, and
when a number of the minute sipes in the land portion is n, a maximum width in the tire width direction of the land portion is BW (mm), an equivalent length in the tire circumferential direction of the land portion obtained by dividing an outer contour area of the land portion (mm$^2$) by BW is BL (mm), a number of equivalent sipes N is defined as w2×n/BW, an average sipe spacing in the tire circumferential direction is expressed as BL/(N+1), and a sipe density SD is expressed as reciprocal of the average sipe spacing in the tire circumferential direction as SD=(N+1)/BL=((w2×n/BW)+1)/BL, SD is 0.15 (1/mm) or more.

Advantageous Effect

According to the present disclosure, it is possible to provide a pneumatic tire with improved on-ice gripping performance.

BRIEF DESCRIPTION OF THE DRAWINGS

In the accompanying drawings:

FIG. 8 provides the specifications of each tire in EXAMPLES;

DETAILED DESCRIPTION

The following is a detailed illustration of the embodiments of this disclosure with reference to the drawings.

First, the internal structure, etc. of the pneumatic tire (hereinafter referred to simply as "tire") can be the same as that of a conventional tire. As an example, the tire may have a pair of bead portions, a pair of sidewall portions connected to the pair of bead portions, and a tread portion disposed between the pair of sidewall portions. Also, the tire may have a carcass straddling toroidally between the pair of bead portions, and a belt disposed on the outer side in the tire radial direction of the crown portion of the carcass.

Hereafter, unless otherwise noted, dimensions, etc. refer to those when the tire is mounted on the applicable rim, filled to the prescribed internal pressure, and unloaded.

Figure 1:
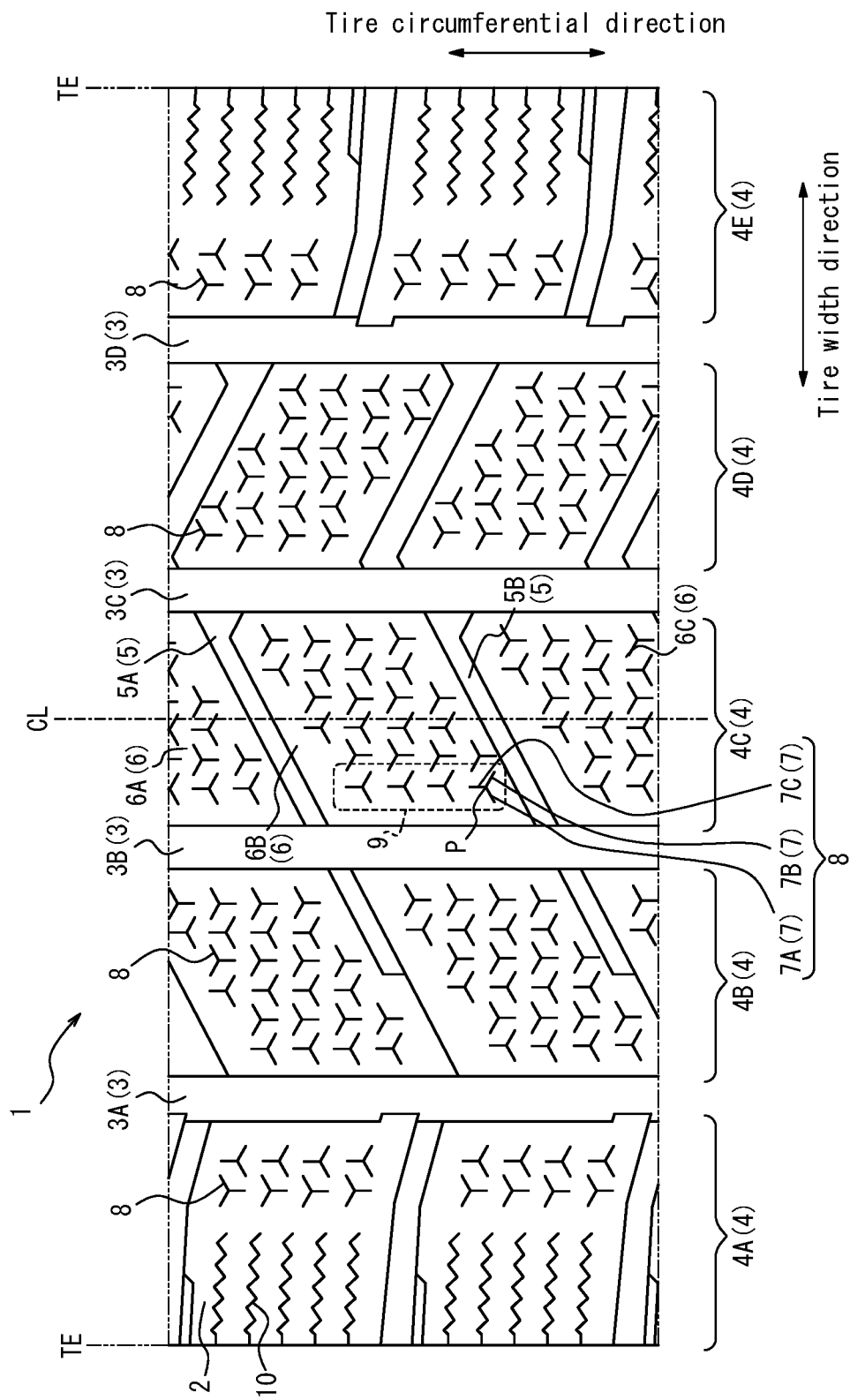
FIG. 1 illustrates a tread pattern of a pneumatic tire according to one embodiment of this disclosure.

FIG. 1 illustrates a tread pattern of a pneumatic tire according to one embodiment of this disclosure. As illustrated in FIG. 1, the tire 1 has one or more (four in the illustrated example) circumferential main grooves 3 (3A to 3D) extending in the tire circumferential direction on the tread surface 2. The number of the circumferential main grooves 3 is not limited to this example and can be changed as needed.

The width (opening width) of the circumferential main grooves 3 is not particularly limited, but can be 4 to 15 mm, for example, and the depth (maximum depth) of the circumferential main grooves 3 is not particularly limited, but can be 6 to 20 mm, for example. In the illustrated example, the circumferential main grooves 3 extend straightly in the tire circumferential direction, but it can also extend in a zigzag or flexing manner. The circumferential main grooves 3 may be inclined at an angle of 5° or less with respect to the tire circumferential direction.

As illustrated in FIG. 1, the circumferential main grooves 3 and the tread edges TE form a plurality (five in the illustrated example) of land portions 4 (4A to 4E). That is, the land portion 4A is defined by the tread edge TE and the circumferential main groove 3A, the land portion 4B is defined by the circumferential main grooves 3A and 3B, the land portion 4C is defined by the circumferential main grooves 3B and 3C, the land portion 4D is defined by the circumferential main grooves 3C and 3D, and the land portion 4E is defined by the tread edge TE and the circumferential main groove 3D. In this way, the tire has at least one land portion 4.

A plurality of width direction grooves 5 (5A and 5B) extending in the tire width direction are disposed at intervals in the tire circumferential direction on each of the land portions 4A to 4E. In the land portions 4A, 4C, 4D, and 4E, the width direction grooves 5 are connected to two adjacent circumferential main grooves 3, thus the land portions 4A, 4C, 4D, and 4E are divided into blocks 6 (6A, 6B, and 6C). On the other hand, in the land portion 4B, the width direction grooves 5 are connected to the circumferential main groove 3B at one end and terminates within the land portion 4B at the other end, thus the land portion 4B is a rib-shaped land portion (a land portion not completely divided circumferentially by the width direction grooves 5). The other end of the width direction groove 5 is connected to a width direction sipe extending in the tire width direction, and the width direction sipe extends from the other end of the width direction groove 5 and is connected to the circumferential main groove 3A.

The width of the width direction groove 5 (the opening width, or the maximum width if the groove width varies) is not particularly limited, but can be 2 to 10 mm, for example. The depth (maximum depth) of the width direction groove 5 is not limited, but can be 5 to 20 mm, for example. Furthermore, the width direction groove 5 preferably extends in the tire width direction or be inclined at an angle of more than 0° and 45° or less with respect to the tire width direction. The width direction grooves 5 can be arranged at equal intervals in the tire circumferential direction, or may be arranged with various pitch intervals in order to reduce pattern noise.

The sipe width (the opening width) of the width direction sipe is not particularly limited, but can be 0.3 to 1 mm. The sipe depth (maximum depth) of the width direction sipe is not limited, but can be 3 to 10 mm, for example. Furthermore, the width direction sipe preferably extends in the tire width direction or be inclined at an angle of more than 0° and 45° or less with respect to the tire width direction.

Note, that the land portions 4A and 4B are provided with width direction sipes 10 extending from the tread edge TE and terminating in the land portions.

Here, in this tire 1, a plurality of minute sipes 7 (7A, 7B, and 7C) are disposed on at least one of the land portions 4 (in the illustrated example, all land portions 4). In the illustrated example, a plurality of minute sipes 7 are disposed in each block (or in each portion defined by the width direction groove 5 and the width direction sipes on the land portion 4B). The minute sipes 7A, 7B, and 7C are connected to each other to form a connected sipe 8. The connected sipes 8 constitute a sipe unit, and the sipe units are repeatedly arranged (in the tire circumferential direction in the illustrated example) on the land portion 4.

As illustrated in FIG. 1, at least one end in an extending direction of the minute sipe of at least one of the minute sipes (in the illustrated example, each minute sipe 7A, 7B, and 7C) terminates within the land portion 4. In the illustrated example, one end of each minute sipe 7A, 7B, and 7C terminates within the land portion 4 without being connected to the circumferential main grooves or the width direction grooves, while the other ends are connected to each other at a single connection point P and terminate within the land portion 4. As illustrated in the figure, the minute sipes 7A, 7B, and 7C extend radially from the connection point P. Note, that it can be configured with two minute sipes or four or more minute sipes extending radially from a single connection point.

Figure 2:
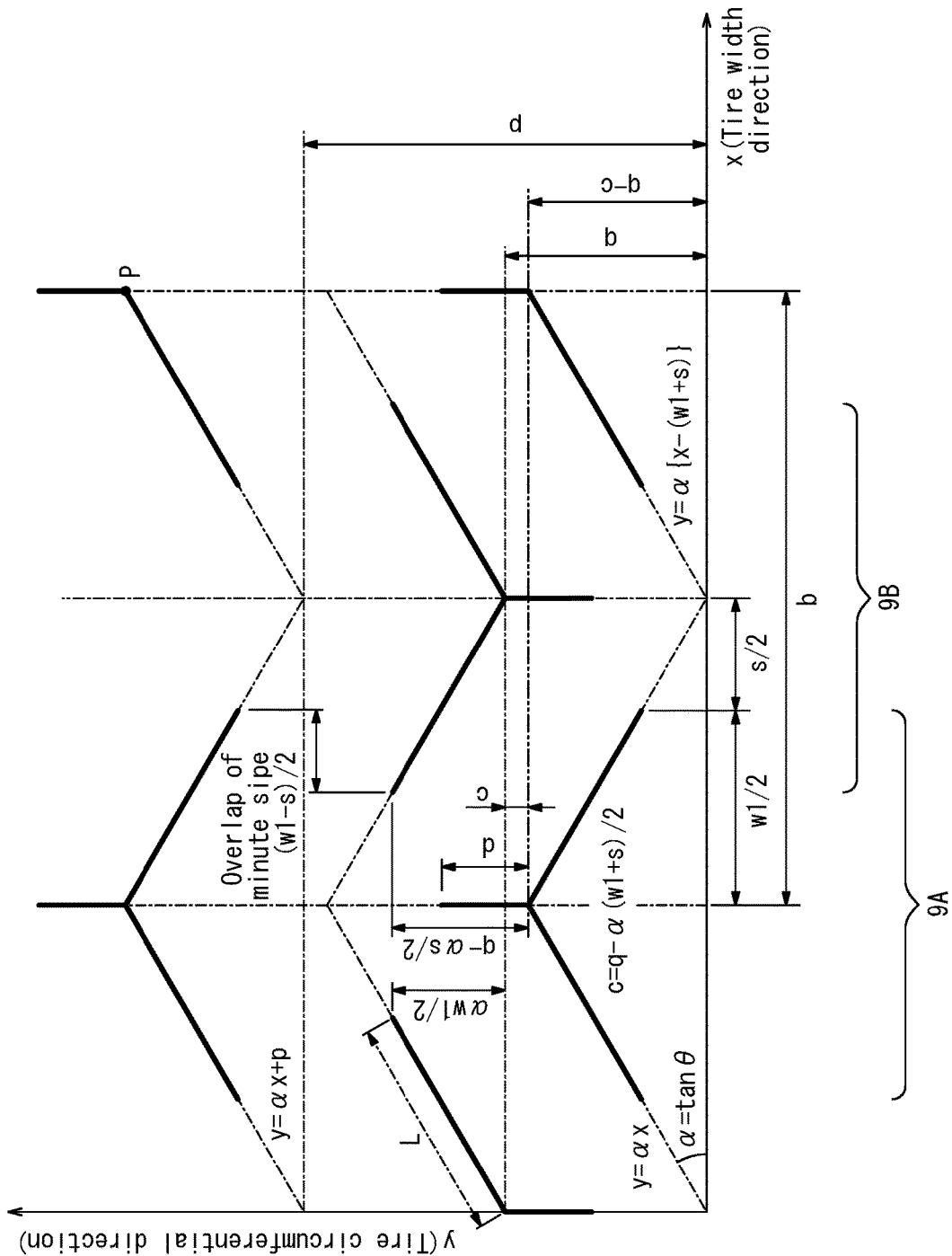
FIG. 2 schematically illustrates an arrangement of sipe units illustrated in FIG. 1.
Figure 3:
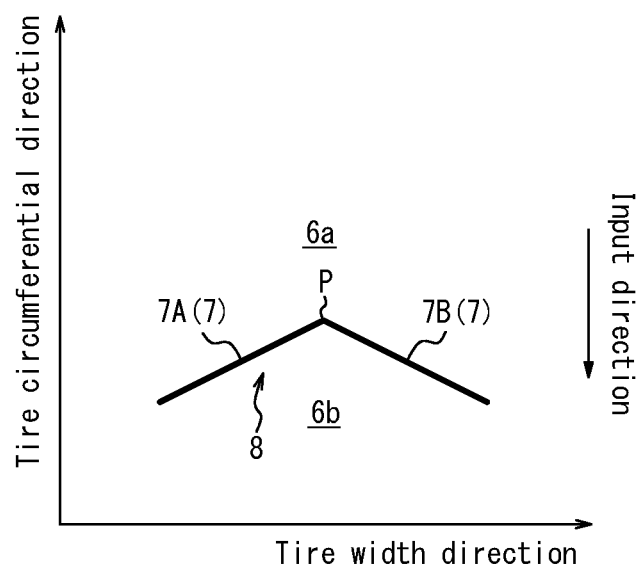
FIG. 3 schematically illustrates an arrangement of a sipe unit when the sipe unit illustrated in FIG. 1 does not include a sipe 7C.
Figure 4A:
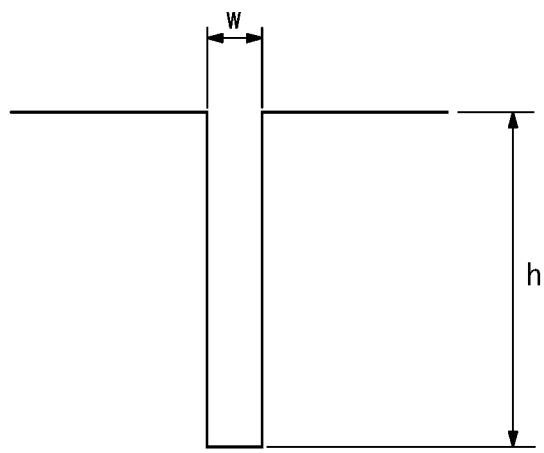
FIG. 4A is a cross-sectional view of the sipe.
Figure 4B:
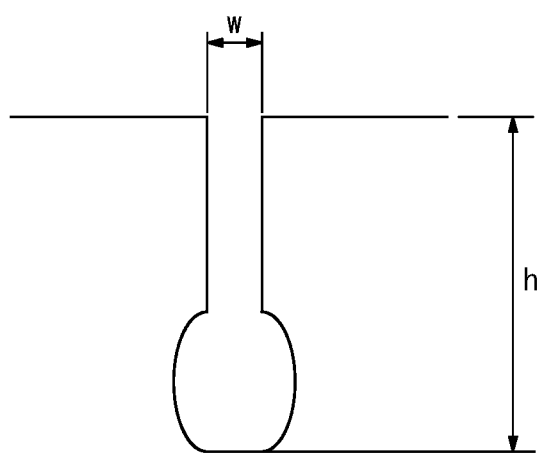
FIG. 4B is a cross-sectional view of the sipe.

The configuration of the sipe unit is described below with reference to FIGS. 2, 3, and 4. FIG. 2 schematically illustrates the arrangement of the sipe units illustrated in FIG. 1. FIG. 3 schematically illustrates the arrangement of the sipe units when the sipe units illustrated in FIG. 1 do not include the third sipe 7C. FIGS. 4A and 4B are cross-sectional views of the sipe.

As illustrated in FIGS. 1 and 2, the sipes 7 that constitute the sipe unit include a first sipe 7A extending from the connection point P to one side in the tire width direction (left side in the drawing) and a second sipe 7B extending from the connection point P to the other side in the tire width direction (right side in the drawing) in the developed view of the tread surface 2. Furthermore, the first sipe 7A and the second sipe 7B extend from the connection point P to the same side in the tire circumferential direction (lower side in the drawing) in the developed view of the tread surface 2. As a result, each of the first sipe 7A and the second sipe 7B extends in a straight line at an angle with respect to the tire width direction. Hereafter, the first sipe 7A is also referred to simply as sipe 7A and the second sipe 7B is also referred to simply as sipe 7B.

More specifically, each of the first sipe 7A and the second sipe 7B extends in a straight line so that the angle θ with respect to the tire width direction satisfies 0°<θ<45° in this example. Thus, the sipes 7A and 7B are inclined with respect to the tire width direction, which allows the sipes 7A and 7B to contribute not only to improving the braking and driving forces of the tire 1 in the tire circumferential direction, but also to improving the lateral grip performance. In particular, by setting θ<45°, the tire widthwise component of the sipes 7A and 7B is larger than the tire circumferential component thereof, and the sipe 7 can contribute to the improvement of braking and driving force in the tire circumferential direction, which is most important for safety. In this embodiment, the angle θ (θ1) between the first sipe 7A and the tire width direction and the angle θ (θ2) between the second sipe 7B and the tire width direction are equal to each other. However, the angle θ1 between the first sipe 7A and the tire width direction and the angle θ2 between the second sipe 7B and the tire width direction may be different from each other. More preferably, θ1 and θ2 should be 35° or less.

In FIG. 2, the lengths of the first and second sipes 7A and 7B are identical in the extending direction thereof. The length of sipes 7A and 7B in the extending direction thereof is preferably 3 to 15 mm, for example, 3 to 10 mm is more preferred, and 3 to 5 mm is even more preferred.

Here, when the length in the tire width direction of the connected sipe 8 (when projected in the tire width direction) is w1 (mm) and the depth (maximum depth) of the minute sipe 7 is h (mm), w1×h is 150 (mm$^2$) or less. Preferably, w1×h is 100 (mm$^2$) or less, and 50 (mm$^2$) or less is more preferred.

The sipe 7 constituting the sipe unit includes a third sipe 7C extending along the tire circumferential direction from the connection point P. As illustrated in FIG. 2, the third sipe 7C extends from the connection point P to the opposite side in the tire width direction (upper side in the drawing) from the first sipe 7A and the second sipe 7B in the developed view of the tread surface 2. Hereafter, the third sipe 7C is also referred to simply as sipe 7C. FIG. 3 schematically illustrates an arrangement of the sipe unit when the sipe unit illustrated in FIG. 1 does not include the sipe 7C. If the sipe unit does not have the third sipe 7C extending along the tire circumferential direction, the sipe unit will be mountainous (<type) with the connecting point P protruding in the tire circumferential direction, as illustrated in FIG. 3. In this way, the sipe unit may consist of only the first sipe 7A and the second sipe 7B.

Referring again to FIG. 2, the length of the third sipe 7C in the extending direction thereof can be, for example, 1 to 15 mm. The length of the sipe 7C may be shorter than the lengths of the sipes 7A and 7B. In this way, by reducing the length of the sipe 7C, the percentage of the sipes 7A and 7B having a tire width direction component is increased in the sipe unit 8 without changing the total length of each sipes 7 that constitute the sipe unit 8. This makes it easier for the sipe unit to contribute to the improvement of the braking and driving forces in the tire circumferential direction of the tire 1. In addition, the depth h of the sipe 7C may be equal to the depth h of the sipes 7A and 7B. The depth h of the sipe 7C is, for example, 3 mm or more. The depth h of the sipe 7C may be 6.7 mm, for example.

Referring to FIGS. 4A and 4B, the cross-sectional shape of the sipe 7 in a plane perpendicular to the extending direction of the sipe 7 in the tread surface 2 is described. In this embodiment, the cross-sectional shape of the sipe 7 in a plane perpendicular to the extending direction of the sipe 7 is rectangular, as illustrated in FIG. 4A. In the sipe 7 illustrated in FIG. 4A, the width w of the sipe 7 may be 0.4 mm, for example. However, the cross-sectional shape of the sipe 7 in a plane perpendicular to the extending direction of the sipe 7 may be shaped other than rectangular. For example, the sipe 7 may be shaped with its bottom bulging in a cross section perpendicular to the extending direction of the sipe 7, as illustrated in FIG. 4B. In addition, for example, the sipe 7 may be rounded at its bottom in a cross section perpendicular to the extending direction of the sipe 7. For example, in the cross section of the sipe 7 perpendicular to the extending direction of the sipe 7 illustrated in FIG. 4A, the bottom portion of the sipe 7 may be R-chamfered at both ends in the width direction of the sipe 7, or the bottom portion of the sipe 7 may be semicircular. In the sipe 7 illustrated in FIG. 4B, the width w of the sipe 7 may be 0.4 mm, for example, in the area of 50% or more of the depth of the sipe 7.

As illustrated in FIG. 1, the connected sipe 8 constitutes a sipe unit, and the sipe units are repeatedly arranged on the land portion 4. In the illustrated example, the sipe units are arranged to be spaced apart from each other in the tire circumferential direction. In the illustration, a plurality of vertical rows in which the sipe units are arranged in the tire circumferential direction are disposed in the tire width direction, and the sipe units in one vertical row and the sipe units in an adjacent vertical row adjacent to the one vertical row are aligned with a phase shift in the tire circumferential direction (shifted by half a pitch in the illustrated example).

Furthermore, when a number of the connected sipes 8 in the land portion is n, a maximum width in the tire width direction of the land portion is BW (mm), an equivalent length in the tire circumferential direction of the land portion obtained by dividing outer contour area of the land portion (mm$^2$) by BW is BL (mm), a number of equivalent sipes N (which is the number of sipes converted to transverse sipes that are provided to completely cross the land portion) is defined as w1×n/BW, an average sipe spacing in the tire circumferential direction is expressed as BL/(N+1), and a sipe density SD is expressed as the reciprocal of the average sipe spacing in the tire circumferential direction as, $$SD = (N + 1)/BL = ((w1 \times n/BW) + 1)/BL,$$

in this embodiment, SD is 0.15 (1/mm) or more.

The following is a description of the effects of the pneumatic tire of this embodiment.

In the pneumatic tire of this embodiment, the sipe units are repeatedly arranged in the land portion, w1×h is 150 (mm$^2$) or less, and the sipe density SD is 0.15 (1/mm) or more. Thereby, the sipes can be arranged at a high density to improve the effect of removing the water film.

Furthermore, since at least one end in an extending direction of the minute sipe of at least one of the minute sipes terminates within the land portion 4, the reduction in rigidity of the land portion can be controlled (compared to the case where both ends are connected to the circumferential main grooves and/or the width direction grooves, for example).

Thereby, it is possible to control a decrease in block rigidity while arranging the sipes at a high density, so that the on-ice gripping performance can be improved.

In particular, when a plurality of sipe units are arranged to be spaced apart from each other in the tire circumferential direction, as in this embodiment, since mutual reinforcement occurs continuously within the land portion, the reduction in rigidity of the land portion can be further controlled.

In addition, a plurality of vertical rows, in which the sipe units are arranged in the tire circumferential direction, are disposed in the tire width direction, and the sipe units in one vertical row and the sipe units in an adjacent vertical row adjacent to the one vertical row are arranged with a phase shift in the tire circumferential direction, which allows for the sipe units to being arranged in a well-balanced manner to avoid the occurrence of areas where the reduction in rigidity of the land portions is locally large, and in addition, which allows for the edge component to being arranged in a well-balanced manner to improve the efficiency on the effect of removing water film, thereby further improving the on-ice gripping performance.

In particular, it is preferable that w1×h be 100 (mm$^2$) or less, and it is more preferable that w1×h be 50 or less (mm$^2$).

This is because by making the sipes minute, the sipes can be arranged at a higher density to further improve the effect of removing the water film.

Also, it is preferable that the sipe density SD be 0.20 (1/mm) or more, and it is more preferable that it be 0.30 (1/mm) or more. This is because the sipes can be arranged at a higher density to further improve the effect of removing the water film.

In addition, the minute sipes 7 are connected to each other to form the connected sipe 8, which allows the minute sipes 7 to be arranged at a high density. The configuration of the minute sipes 7 extending radially from the connection point P allows for edge components in various directions. In addition, the blades, that are placed in the mold for the tire 1 to form the respective minute sipes 7 during tire manufacturing, support each other at the connection point P, and this structure increases the bending rigidity of the blade and improves the durability of the blade. Therefore, the durability of the mold for the tire 1 is improved, and the productivity of the tire 1 is increased. The fact that the sipe unit has the third sipe 7C extending along the tire circumferential direction from the connection point P, in addition to the first and second sipes 7A and 7B, reduces the difference in ground pressure applied to the contact patch of the land portion 4 between the forward and rearward portions of the sipe unit, and prevents the forward portion of the sipe unit from lifting, thereby the decrease in footprint area can be controlled.

In FIG. 2, two vertical rows 9A and 9B of the sipe units are disposed side by side in the tire width direction in the developed view of the tread surface 2. In this embodiment, the shape of the plurality of sipe units arranged on the land portion 4 is linearly symmetrical about the axis of the respective third sipe 7C.

In the two vertical rows of sipe units adjacent to each other in the tire width direction, the third sipes 7C of the sipe units constituting each vertical row are arranged to extend from the connecting point P in different directions in the tire circumferential direction. Specifically, in FIG. 2, the plurality of sipe units constituting the first sipe-unit vertical row 9A among the plurality of sipe-unit vertical rows 9A and 9B are arranged so that the respective third sipe 7C extends from the connection point P to one side (upper side in the drawing) in the tire circumferential direction. On the other hand, the plurality of sipe units constituting the second sipe-unit vertical row 9B adjacent to the first sipe-unit vertical row 9A are arranged so that the respective third sipes 7C extend from the connection point P to the other side (lower side in the drawing) in the tire circumferential direction.

With the sipe-unit vertical rows arranged in this manner, in the tire width direction, in the land portion between the third sipes 7C of the plurality of sipe units constituting the adjacent sipe-unit vertical rows 9A and 9B (between the center lines of the adjacent sipe-unit vertical rows 9A and 9B), the plurality of minute sipes 7 are extended inclined in the same direction with respect to the tire width direction. Specifically, in FIG. 3, the second sipe 7B of the sipe unit 8A included in the sipe-unit vertical row 9A and the second sipe 7B of the sipe unit 8B included in the sipe-unit vertical row 9B extend in approximately parallel to each other. This allows the minute sipes 7 to be periodically arranged in the land portion, sandwiched between the centerlines of the sipe-unit vertical rows 9A and 9B adjacent to each other in the tire width direction, and the shape and size of the land portion sandwiched between the minute sipes 7 in the tire circumferential direction to be uniform. Therefore, the tread surface 2 can be brought into contact with the road surface more uniformly, the distribution of the ground pressure applied to the contact patch of the tread surface 2 can be made uniform, and the ground contact area of the tire 1 can be increased. Thus, the on-ice gripping performance of the tire 1 can be further improved.

In the illustrated example, at least one of the plurality of sipe units 8 constituting the first sipe-unit vertical row 9A of the plurality of sipe-unit vertical rows and at least one of the plurality of sipe units 8 constituting the second sipe-unit vertical row 9B adjacent to the first sipe-unit vertical row 9A face each other in the tire circumferential direction in part in the tire width direction. Specifically, in FIG. 2, the second sipe 7B of the sipe unit constituting the sipe-unit vertical row 9A and the second sipe 7B of the sipe unit constituting the sipe-unit vertical row 9B face each other in the tire circumferential direction only in part in the tire width direction. Here, "a line segment X and a line segment Y face each other in the direction Z" means that the line segment X and the line segment Y are separated from each other in the direction Z and that each of the ends of the line segment Y is located on two straight lines extended along the direction Z from each end of the line segment X. However, "the second sipe 7B of the sipe unit constituting the sipe-unit vertical row 9A and the second sipe 7B of the sipe unit constituting the sipe-unit vertical row 9B face each other in the tire circumferential direction only in part in the tire width direction" shall include the case where only the end point of the sipe 7B in the sipe unit and the end point of the sipe 7B in the sipe unit are respectively located on the straight line extending along the tire circumferential direction. In FIG. 2, a portion in the tire width direction of the second sipe 7B of the sipe-unit vertical row 9A and a portion in the tire width direction of the second sipe 7B of the sipe-unit vertical row 9B face each other in the tire circumferential direction. Here, the length w1 in the tire width direction of each of the sipe-unit vertical rows 9A and 9B (w1=2L×cos θ) and the distance b in the tire width direction between the centerlines of adjacent sipe-unit vertical rows 9A and 9B satisfy b−w1≥0. As a result, when the sipe units constituting the sipe-unit vertical row 9A and the sipe units constituting the sipe-unit vertical row 9B are projected along the tire circumferential direction, as indicated by the shaded shading in FIG. 3, at least one of them seamlessly across the tire width direction of the sipe unit. Therefore, without changing the shape of each sipe unit constituting the first and second sipe-unit vertical rows 9A and 9B, the sipe density in the land portion can be maintained by increasing the length in the tire width direction of the sipe-unit vertical rows 9 to the extent that b−w1≥0 is satisfied, and this makes it possible to widen the range in which the sipe units can exert its edge effect and water removal effect while maintaining the sipe density in the land portion. This improves the on-ice gripping performance of the tire 1.

In addition, in the illustrated example, at least one of the third sipes 7C of the plurality of sipe units constituting the first sipe-unit vertical row 9A of the plurality of sipe-unit vertical rows 9 and at least one of the third sipes 7C of the plurality of sipe units constituting the second sipe-unit vertical row 9B adjacent to the first sipe-unit vertical row 9A face each other in the tire width direction at least in part in the tire circumferential direction. Specifically, in FIG. 2, the third sipe 7C of the sipe unit constituting the sipe-unit vertical row 9A and the third sipe 7C of the sipe unit constituting sipe-unit vertical row 9B face each other in the tire width direction in part in the tire circumferential direction. Here, when the distance in the tire circumferential direction between the connection points P of each of the sipe units where the third sipes 7C face each other in the tire width direction is c, c≤d is preferred. However, d is the length of the third sipe in the extending direction thereof.

Among the plurality of the sipe-unit vertical rows 9, between the sipe-unit vertical rows 9 in which the third sipes 7C of the sipe units constituting each of the sipe-unit vertical rows are arranged to extend from the connecting point P in a same direction in the tire circumferential direction, the positions in the tire circumferential direction of the plurality of the sipe units constituting each sipe-unit vertical row 9 may be equal to each other. Specifically, in the sipe units constituting the sipe-unit vertical row 9A and the sipe units constituting the sipe-unit vertical row 9C, which is arranged so as to sandwich the sipe-unit vertical row 9B in the tire width direction together with the sipe-unit vertical row 9A, the third sipes 7C extend in the same direction in the tire circumferential direction from the connection point P. In FIG. 2, the sipe units in the sipe-unit vertical row 9A and those in the sipe-unit vertical row 9C are equally positioned in the tire circumferential direction. This will further equalize the sipe density in the block land portion 6. Therefore, the tread surface 2 can be brought into contact with the road surface more uniformly, the distribution of the ground pressure applied to the contact patch of the tread surface 2 can be made uniform, and the ground contact area of the tire 1 can be increased. Thus, the on-ice gripping performance of the tire 1 can be further improved.

As illustrated in FIG. 2, when a pitch interval between the sipe units adjacent to each other in the tire circumferential direction within the one vertical row is p (mm), and a circumferential clearance distance between the sipe unit in the one vertical row and the sipe unit in the adjacent vertical row is q (mm), the following is preferably satisfied:

$$p/2 \times 0.7 \leq q \leq p/2 \times 1.3.$$

This is because by setting it within the above range, the sipe units can be arranged in a well-balanced manner.

In addition, as illustrated in FIG. 1, the sipe units are arranged in a straight line, in the tire width direction or at an inclination angle of 30° or less with respect to the tire width direction, to form a horizontal row, and as illustrated in FIG. 2, when a distance in the tire width direction between the connection points of the sipe units adjacent to each other in one horizontal row is b, and a sipe spacing, which is the shortest distance in the tire width direction between the sipe units adjacent to each other in the one horizontal row, is s, the following is preferably satisfied:

$$0.2 \leq s/(b-s) \leq 1.0.$$

By setting s/(b−s)=s/w1 to 0.2 or more, the spacing area width s between the sipes, that is, the width of the connecting area of the land portion, can be sufficiently secured to improve the rigidity of the land portion. On the other hand, by setting s/(b−s)=s/w1 to 1.0 or less, and thus to s>w1, the width direction components of the sipes adjacent to each other in the circumferential direction overlaps and this allows to avoid the occurrence of blank areas of the sipes.

The spacing s is preferably 1.5 (mm) or more. This is because the spacing area width s between the sipes, i.e., the width of the connecting area of the land portion, is wide enough to ensure sufficient rigidity of the land portion.

As illustrated in FIG. 2, the sipe units are arranged in multiple vertical rows in the tire width direction, two adjacent vertical rows are arranged with a phase shift in the tire circumferential direction, so that the sipe units in one vertical row and the sipe units in an adjacent vertical row adjacent to the one vertical row are staggered in the tire circumferential direction; the sipe units are arranged in a straight line, in the tire width direction or at an inclination angle of 30° or less with respect to the tire width direction, to form a horizontal row; and when the distance in the tire width direction between connection points of the sipe units adjacent to each other in one horizontal row is b, and the clearance distance in the tire circumferential direction between the connection point of the sipe unit in one vertical row and the connection point of the sipe unit in the adjacent vertical row is c, the following is preferably satisfied:

$$0 \leq c/b \leq 1.0.$$

The clearance distance q in the circumferential direction between adjacent sipe vertical rows is $q=(w1+s)/2 \times \alpha + c$. Therefore, by setting c to 0 or more, the distance q can be sufficiently secured and that ensures sufficient rigidity of the land portion. On the other hand, the circumferential distance c of the connection points is not so long as to exceed the widthwise distance b so that to prevent the distance q between sipes from becoming excessive, and that ensures sipe density.

In addition, as illustrated in FIG. 2, when the extension length of the minute sipes of the first sipe 7A and the second sipe 7B is L (mm) and the extension length of the third sipe 7C is d (mm), $$d \leq L \text{ and } d \leq q - \alpha \times s/2$$

is preferably satisfied. However, $\alpha = \tan \theta$.

When the length d of the sipe 7C exceeds $q - \alpha s/2$, the end of the sipe 7C protrudes circumferentially more than the end of the adjacent sipe 7A or sipe 7B. This will cause the sipe 7C to protrude into the spacing area between the sipes 7A, 7B, i.e., the connected area of the land portion, which will reduce the rigidity of the land portion in the connected area. Therefore, by limiting d to the above range, the rigidity of the land portion can be ensured.

Figure 5:
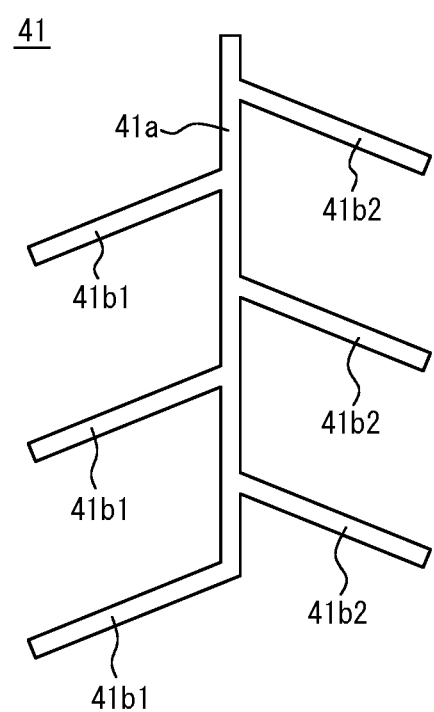
FIG. 5 illustrates a variation of the sipe unit.

As another example of minute sipes forming a connected sipe, as illustrated in FIG. 5, the connected sipes 41 have a main portion 41a extending in a first predetermined direction and a side portion 41b1, 41b2 extending from the main portion 41a to the side of the main portion 41a at an angle with respect to the first predetermined direction and terminating within the land portion, the side portion has a first side portion 41b1 disposed on one side of the main portion and a second side portion 41b2 disposed on the other side of the main portion, and the first side portion 41b1 and the second side portion 41b2 are arranged alternately in the tire circumferential direction. This configuration is effective in promoting drainage in the tire circumferential direction and improving the gripping performance.

In other embodiments of the present disclosure, minute sipes separated from each other constitute a sipe unit (e.g., as a pair of sipes consisting of a pair of minute sipes), and the sipe units are repeatedly arranged on a land portion.

In other embodiments, when the length in the tire width direction of the minute sipes is w2 (mm) and the depth of the minute sipes is h (mm), w2×h is 150 (mm$^2$) or less.

In addition, when a number of the minute sipes in the land portion is n, a maximum width in the tire width direction of the land portion is BW (mm), an equivalent length in the tire circumferential direction of the land portion obtained by dividing an outer contour area of the land portion (mm$^2$) by BW (mm) is BL (mm), a number of equivalent sipes N is defined as w2×n/BW, an average sipe spacing in the tire circumferential direction is expressed as BL/(N+1), and a sipe density SD is expressed as reciprocal of the average sipe spacing in the tire circumferential direction as SD=(N+1)/BL=((w2×n/BW)+1)/BL, SD is preferably 0.15 (1/mm) or more.

These other embodiments can also improve the on-ice gripping performance, similar to the embodiment with the connected sipes illustrated in FIG. 1.

Note, that even in this case, it is particularly desirable that w2×h be 100 (mm$^2$) or less, and it is more desirable that w2×h be 50 (mm$^2$) or less. This is because by making the sipes minute, the sipes can be arranged at a higher density and the effect of removing the water film can be further improved.

In addition, even in this case, a sipe density SD of 0.20 (1/mm) or greater is preferred, and 0.30 (1/mm) or greater is more preferred. This is because the sipes can be arranged at a higher density and the effect of removing the water film can be further improved.

The following is a specific example of a case in which the minute sipes separated from each other constitute a sipe unit.

Figure 6:
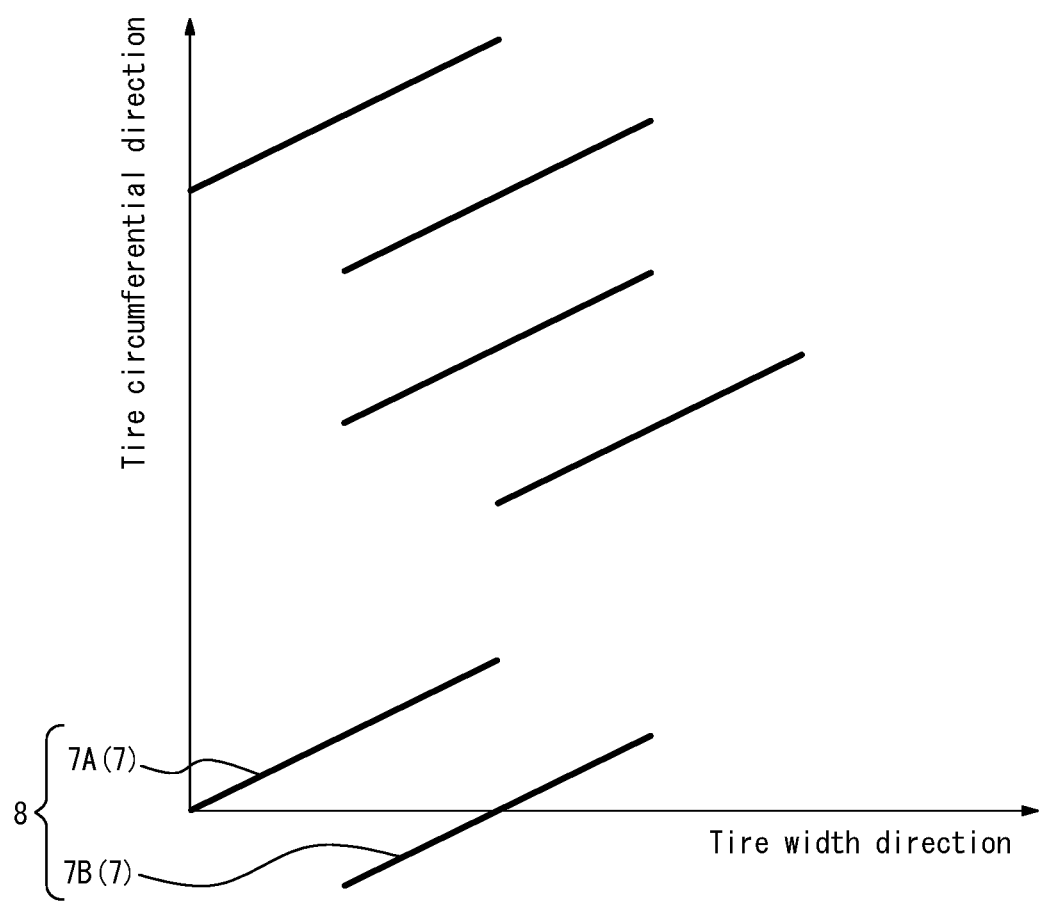
FIG. 6 illustrates a variation of the sipe unit.

As illustrated in FIG. 6, the sipe unit can be configured such that: the sipe unit consists of a pair of sipes 8, each of the pair of sipes 7A, 7B extends such that both ends in the extending direction of the sipes terminate within the land portion, and the pair of sipes are opposed to each other in the tire circumferential direction only in part in the tire width direction.

Figure 7:
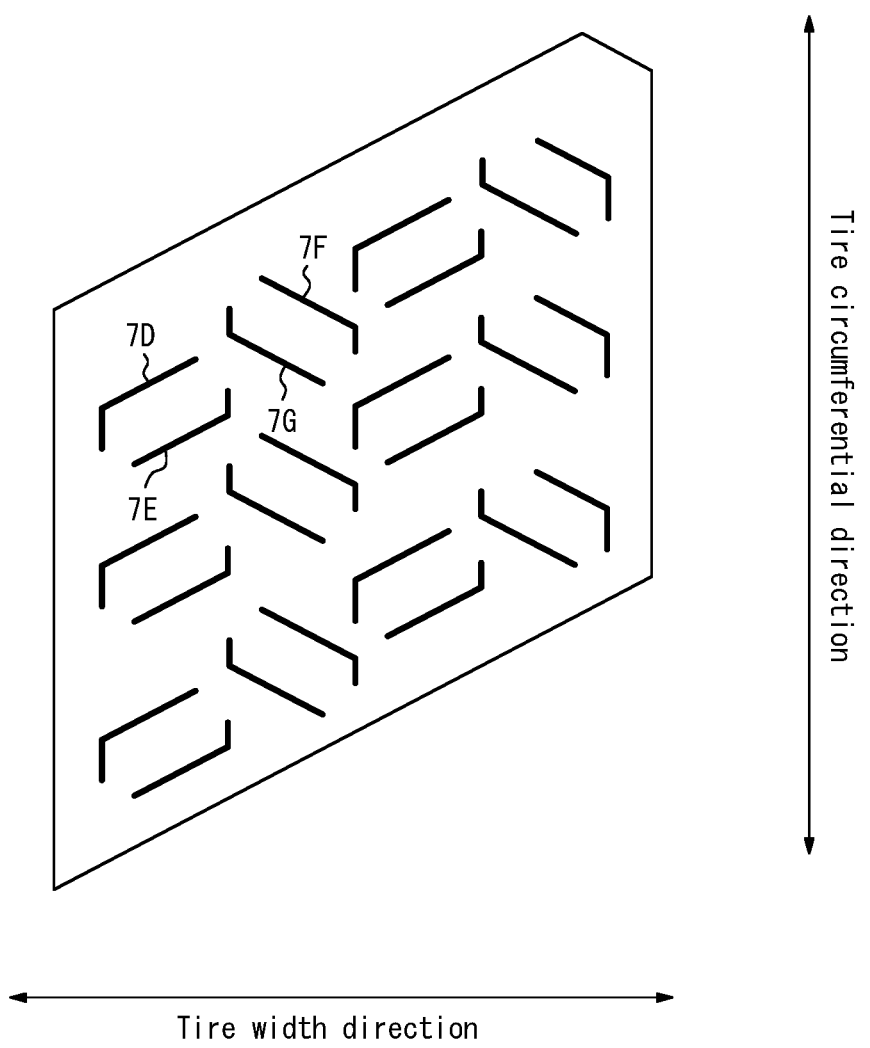
FIG. 7 illustrates a variation of the sipe unit.

Alternatively, as illustrated in FIG. 7, the sipe unit can also be configured such that: the sipe unit consists of a pair of sipes, one sipe 7D and the other sipe 7E constituting the pair of sipes are arranged opposing each other in the tire circumferential direction and have long sides extending in the tire width direction, respectively, the one sipe 7D has a short side extending from either end of the long side in the tire width direction to approach the other sipe 7E side, and the other sipe 7E has a short side extending from the other end of the long side in the tire width direction to approach the one sipe side 7D.

In the adjacent vertical row adjacent to the one vertical row where the sipes 7D and 7E are located, one sipe 7F and the other sipe 7G constitute a sipe unit consisting of a pair of sipes, the sipe unit is arranged symmetrically on an axis parallel to the tire width direction with respect to the one vertical row, and the one vertical row and the adjacent vertical row are arranged with a phase shift in the tire circumferential direction.

Although, in FIG. 7, the one vertical row and the adjacent vertical row are arranged without being offset from each other in the tire width direction, they can also be arranged offset.

EXAMPLES

Figure 9:
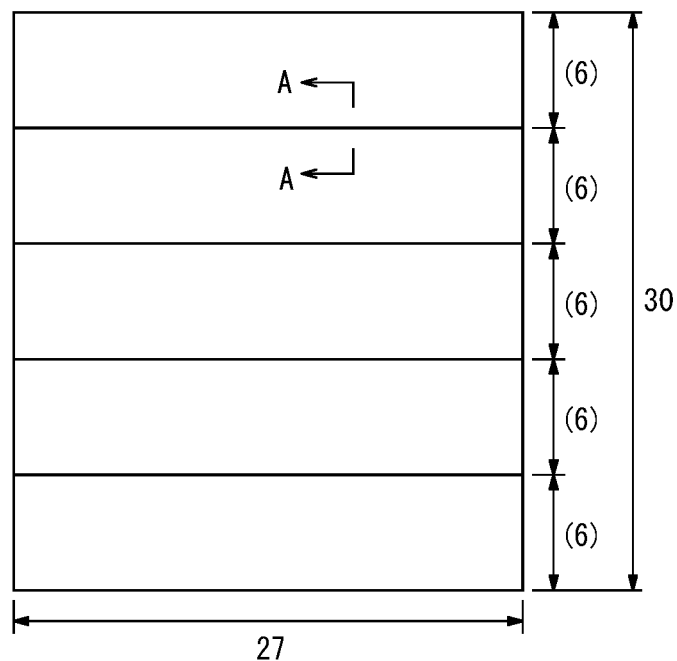
FIG. 9 provides the specifications of Comparative Example 1.
Figure 10:
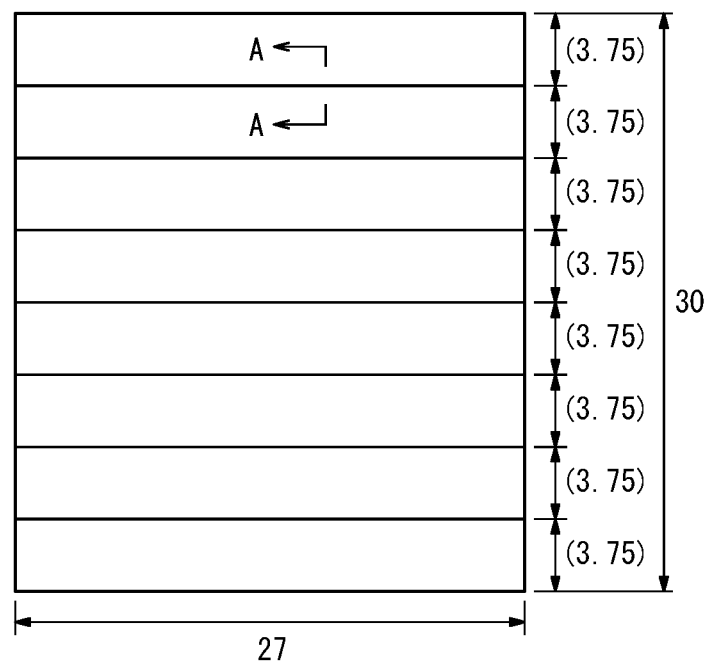
FIG. 10 provides the specifications of Comparative Example 2.
Figure 11:
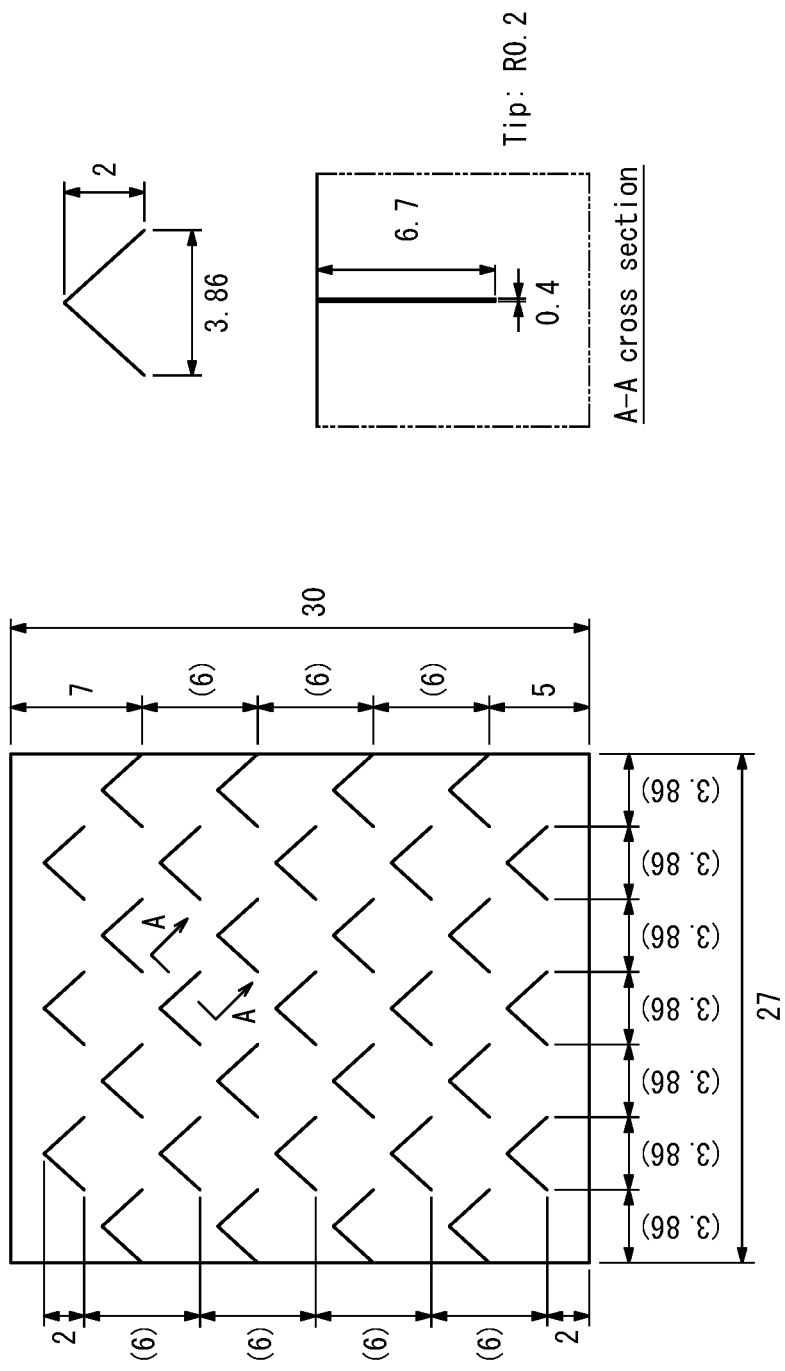
FIG. 11 provides the specifications of Example 1.
Figure 12:
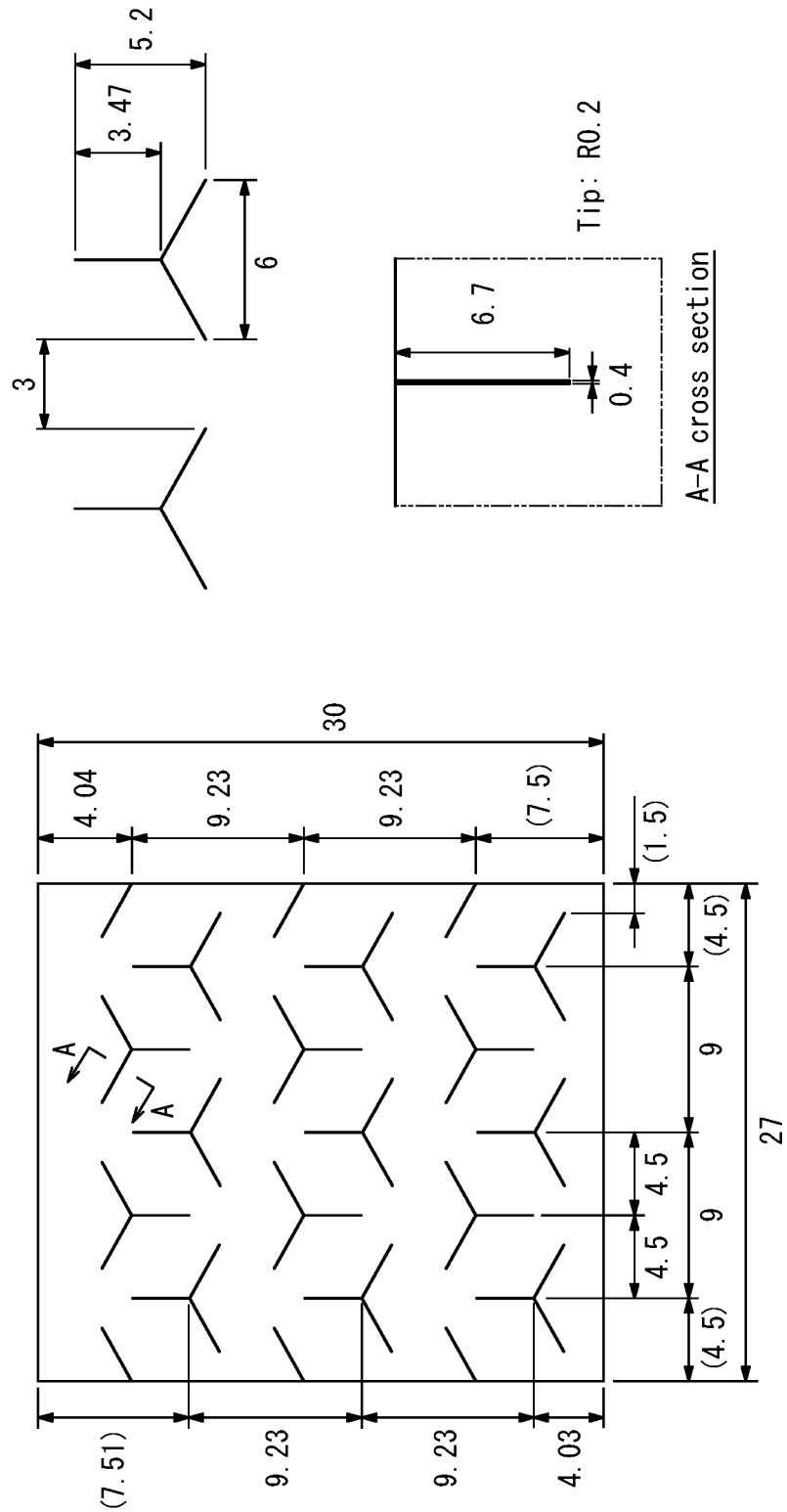
FIG. 12 provides the specifications of Example 2.
Figure 13:
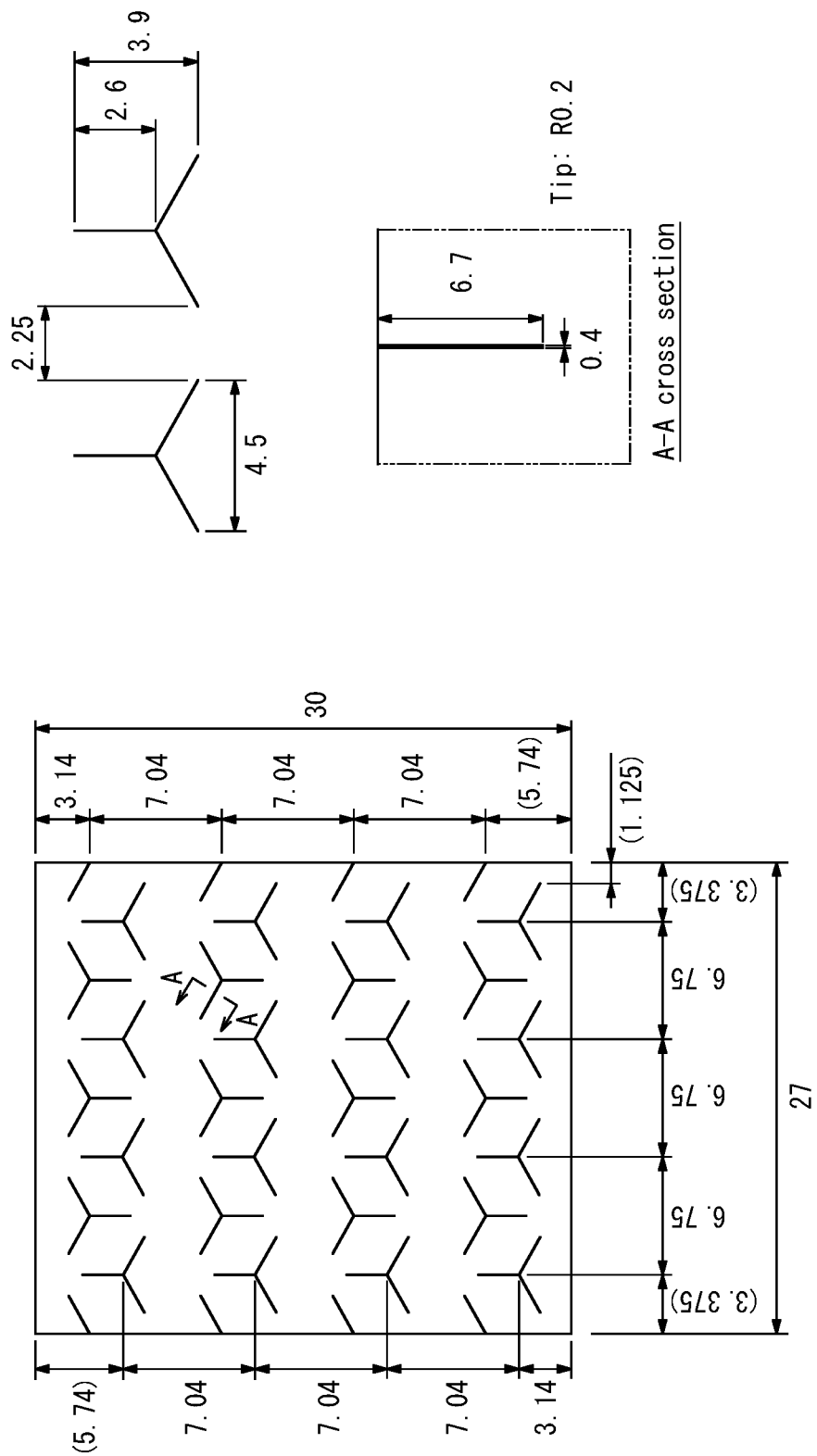
FIG. 13 provides the specifications of Example 3.
Figure 14:
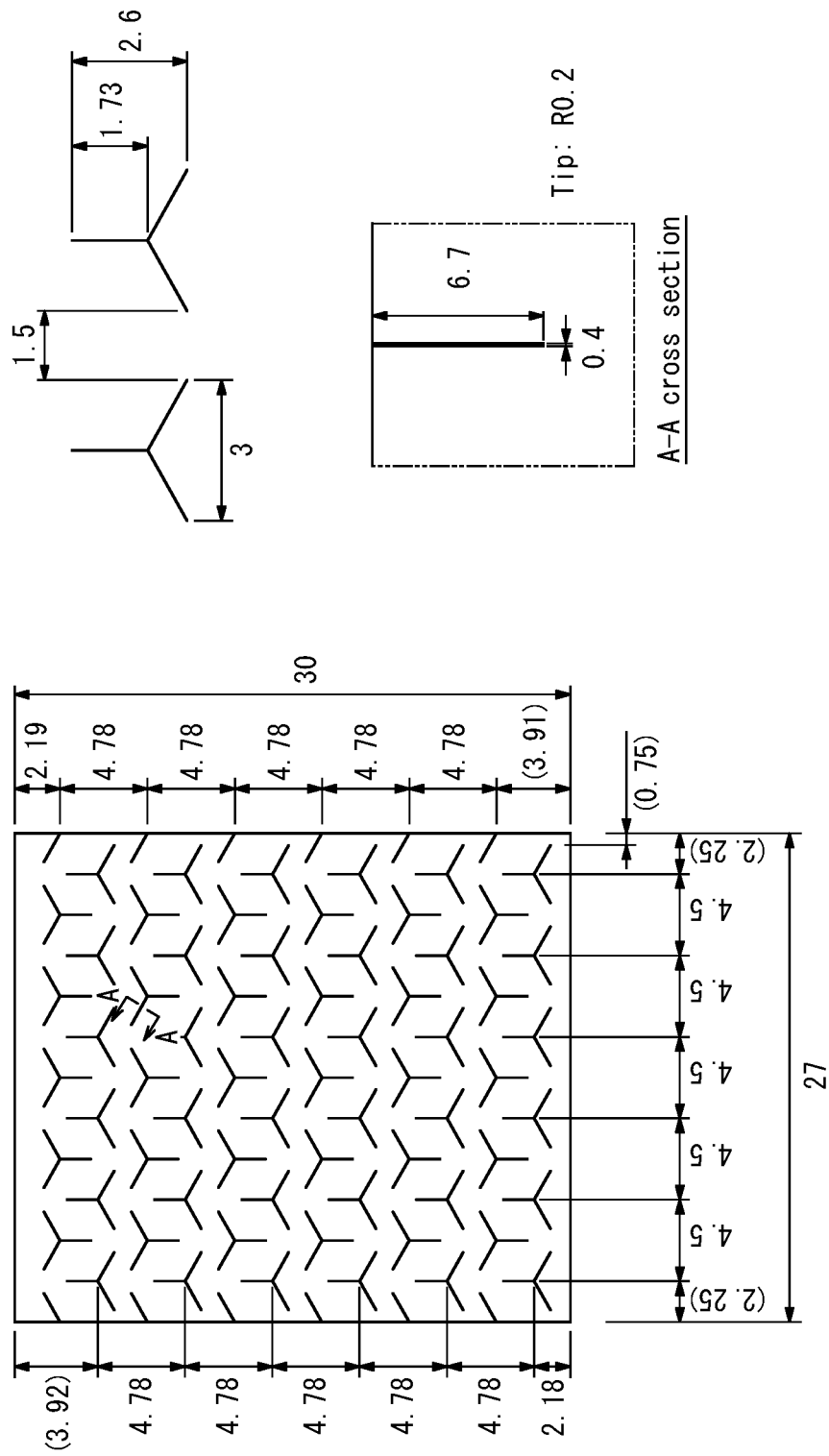
FIG. 14 provides the specifications of Example 4.
Figure 15:
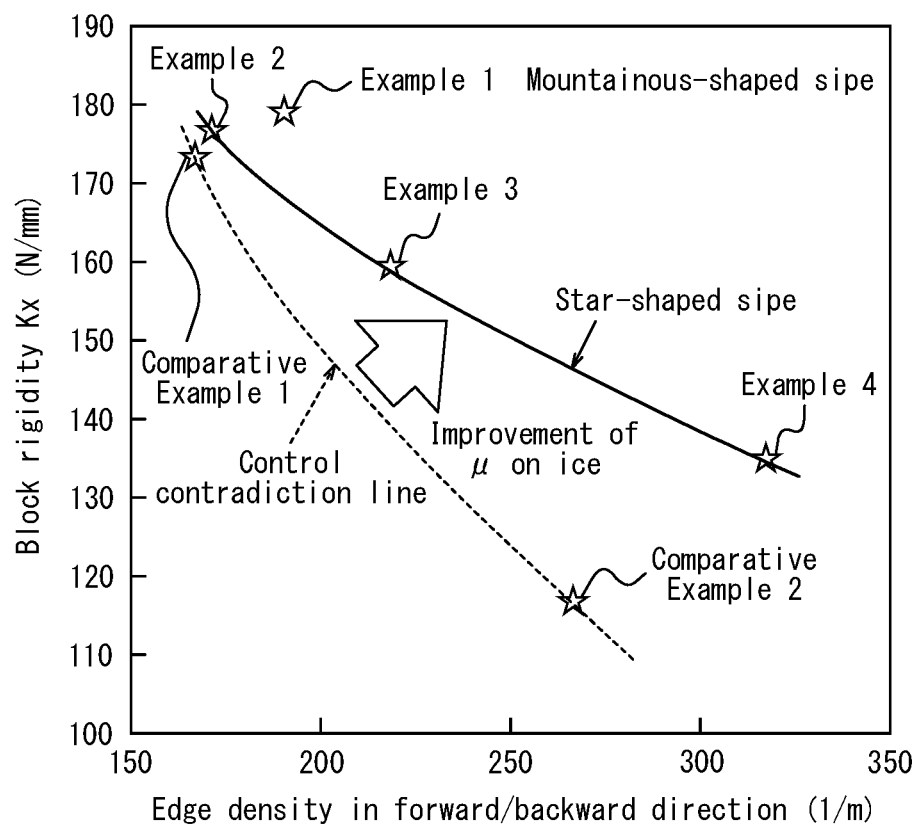
FIG. 15 displays the simulation results on the block rigidity in EXAMPLES.
Figure 16:
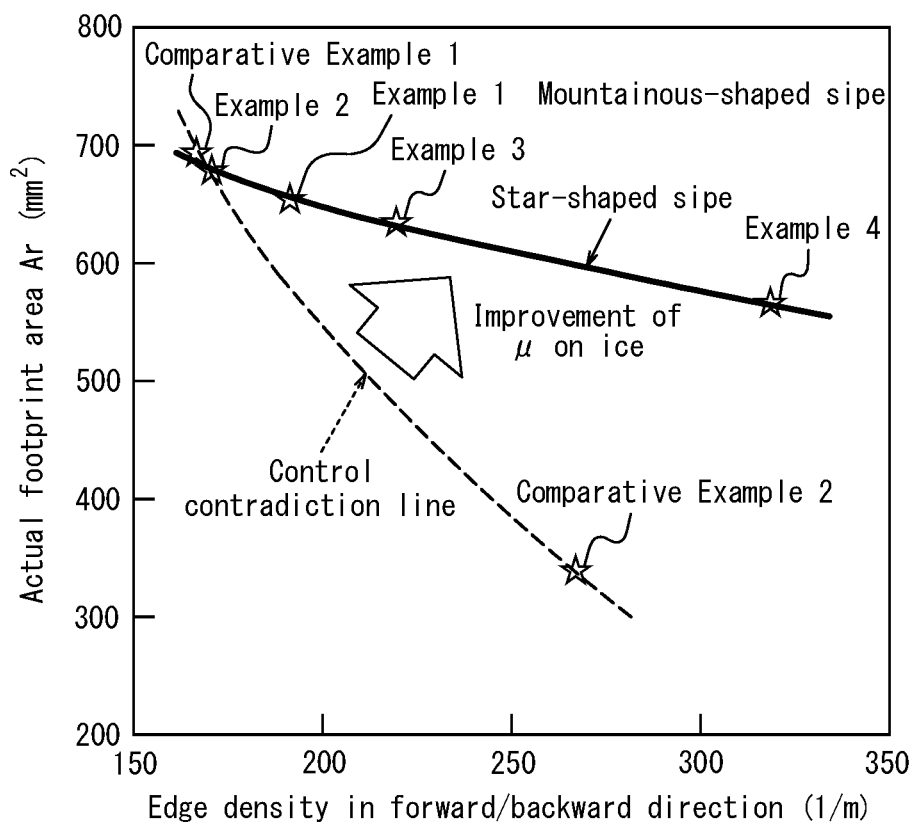
FIG. 16 displays the simulation results on the footprint area in EXAMPLES.

The Finite Element Method (FEM) simulations were performed on the tires of Examples 1 to 4 and Comparative Examples 1 and 2 provided in FIG. 8, and the block rigidity and footprint area were evaluated. Various dimensions, etc. of each tire are provided in each Figure: Comparative Example 1 in FIG. 9, Comparative Example 2 in FIG. 10, Example 1 in FIG. 11, Example 2 in FIG. 12, Example 3 in FIG. 13, and Example 4 in FIG. 14. Although omitted in these Figures, the units are (mm). For the block rigidity, the lateral input at 1 mm displacement was determined by simulation, and for the actual footprint area, the footprint area at ground pressure of 230 kPa and lateral input of 0.3 G was determined by simulation. As displayed in FIGS. 15 and 16, Examples 1 to 4 all improved block stiffness and increased footprint area compared to Comparative Examples 1 and 2.

Figure 17:
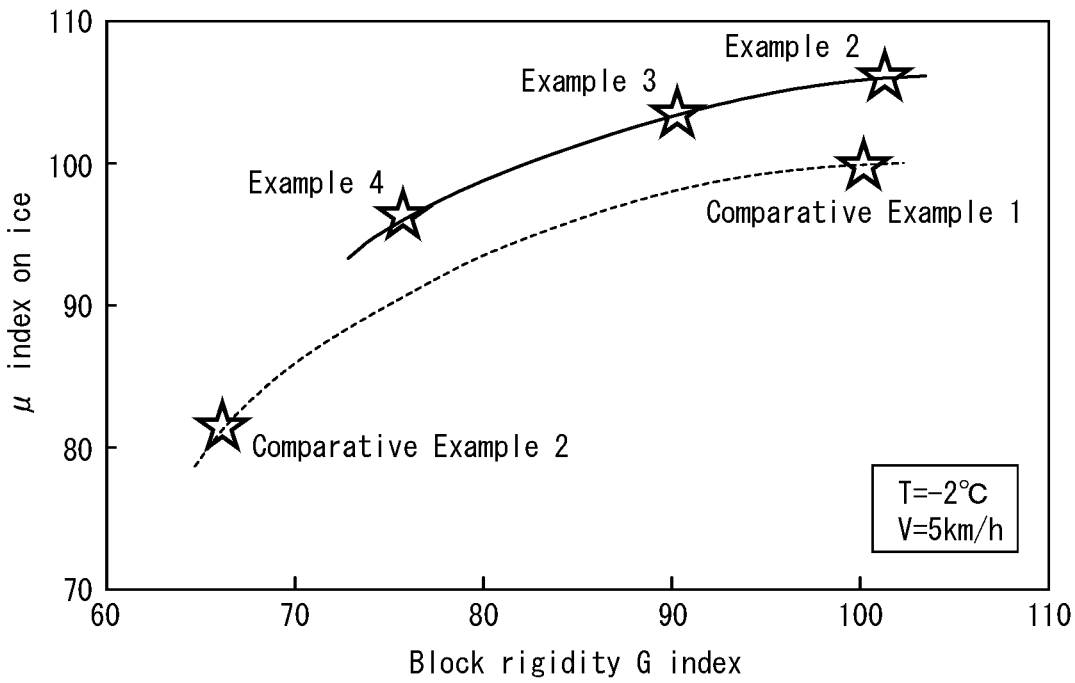
FIG. 17 displays the results on the on-ice coefficient of friction (speed: 5 km/h) in EXAMPLES.
Figure 18:
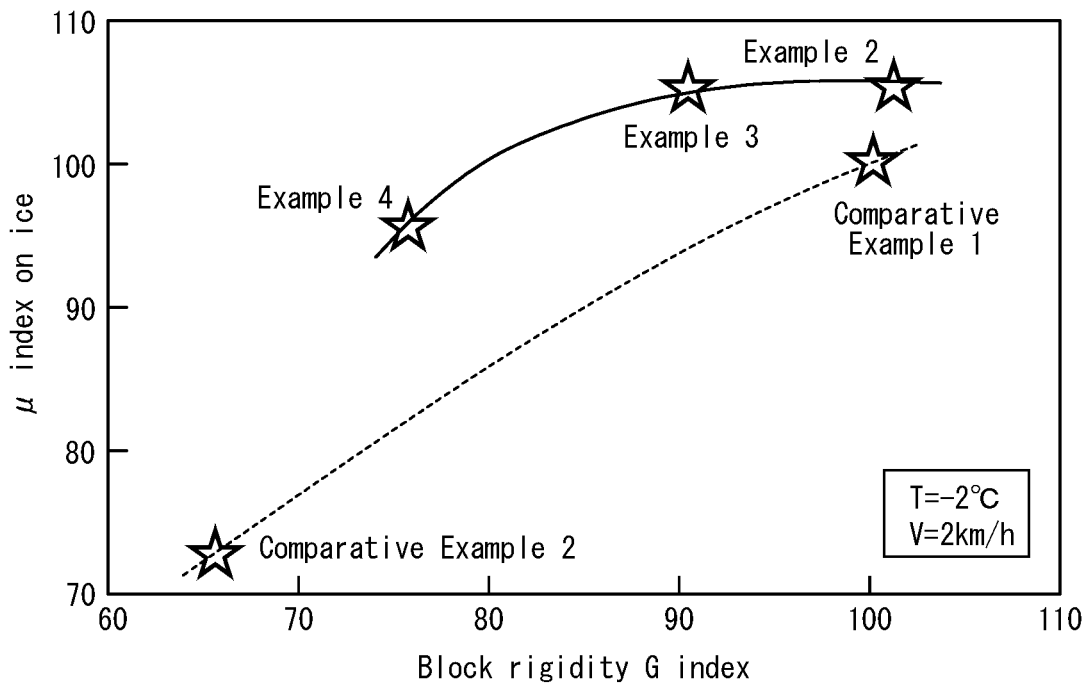
FIG. 18 displays the results on the on-ice coefficient of friction (speed: 2 km/h) in EXAMPLES.

Next, block samples of Comparative Examples 1 and 2 and Examples 2 to 4 were fabricated and the u characteristics on ice were measured in an indoor testing machine at speeds of 5 km/h and 2 km/h. The evaluation results are provided in FIGS. 17 and 18. The ice temperature was set at −2° C. and the ground pressure was 250 kPa. As provided in FIGS. 17 and 18, the coefficient of friction on ice was improved in Examples 2 to 4 over Comparative Examples 1 and 2.

REFERENCE SIGNS LIST

1 Pneumatic tire
2 Tread surface
3 Circumferential main groove
4 Land portion
5 Width direction groove
6 Block
7 Minute sipe
8 Connected sipe
9 Sipe-unit vertical row
10 Width direction sipe

The invention claimed is:

1. A pneumatic tire having at least one land portion in a tread surface, wherein
a plurality of minute sipes are disposed on at least one of the land portions,
the minute sipes are connected to each other to form a connected sipe,
the connected sipe constitutes a sipe unit, and the sipe units are repeatedly arranged on the land portion,
at least one end in an extending direction of the minute sipe of at least one of the minute sipes terminates within the land portion,
when a length in the tire width direction of the connected sipe is w1 (mm) and a depth of the minute sipes is h (mm), w1×h is 150 (mm$^2$) or less,
when a number of the connected sipes in the land portion is n, a maximum width in the tire width direction of the land portion is BW (mm), an equivalent length in the tire circumferential direction of the land portion obtained by dividing an outer contour area of the land portion (mm$^2$) by BW is BL (mm), a number of equivalent sipes N is defined as w1×n/BW, an average sipe spacing in the tire circumferential direction is expressed as BL/(N+1), and a sipe density SD is expressed as reciprocal of the average sipe spacing in the tire circumferential direction as $$SD = (N+1)/BL = ((w1 \times n/BW) + 1)/BL,$$

SD is 0.15 (1/mm) or more, and
in a plan view, three minute sipes are connected to each other at one connection point to form the connected sipe, each of the minute sipes extends radially from the connection point, wherein a first and a second of the three minute sipes extend from the connection point toward a first tire circumferential direction, and a third of the three minute sipes extends from the connection point toward a second tire circumferential direction opposite the first tire circumferential direction, and a length of the third of the three minute sipes is shorter than each of a length of the first and the second of the three minute sipes.

2. The pneumatic tire according to claim 1, wherein a plurality of the sipe units are arranged to be spaced apart from each other in the tire circumferential direction.

3. The pneumatic tire according to claim 2, wherein a plurality of vertical rows in which the sipe units are arranged in the tire circumferential direction are disposed in the tire width direction, and
the sipe units in one vertical row and the sipe units in an adjacent vertical row adjacent to the one vertical row are arranged with a phase shift in the tire circumferential direction.

4. The pneumatic tire according to claim 3, wherein when a pitch interval between the sipe units adjacent to each other in the tire circumferential direction within the one vertical row is p (mm), and a circumferential clearance distance between the sipe unit in the one vertical row and the sipe unit in the adjacent vertical row is q (mm), the following is satisfied:

$$p/2 \times 0.7 \le q \le p/2 \times 1.3.$$

5. The pneumatic tire according to claim 1, wherein a plurality of vertical rows in which the sipe units are arranged in the tire circumferential direction are disposed in the tire width direction, and
the sipe units in one vertical row and the sipe units in an adjacent vertical row adjacent to the one vertical row are arranged with a phase shift in the tire circumferential direction.

6. The pneumatic tire according to claim 5, wherein when a pitch interval between the sipe units adjacent to each other in the tire circumferential direction within the one vertical row is p (mm), and a circumferential clearance distance between the sipe unit in the one vertical row and the sipe unit in the adjacent vertical row is q (mm), the following is satisfied:

$$p/2 \times 0.7 \le q \le p/2 \times 1.3.$$

7. The pneumatic tire according to claim 1, wherein
the sipe units are arranged in a straight line, in the tire width direction or at an inclination angle of 30° or less with respect to the tire width direction, to form a horizontal row,
when a distance in the tire width direction between connection points of the sipe units adjacent to each other in one of the horizontal rows is b, and a sipe spacing, which is the shortest distance in the tire width direction between the sipe units adjacent to each other in the one of the horizontal rows, is s, the following is satisfied:

$$0.2 \le s/(b-s) \le 1.0.$$

8. The pneumatic tire according to claim 7, wherein the s is 1.5 (mm) or more.

9. The pneumatic tire according to claim 1, wherein
the sipe units are disposed in multiple vertical rows in the tire width direction,
two adjacent vertical rows are arranged with a phase shift in the tire circumferential direction, so that the sipe units in one vertical row and the sipe units in an adjacent vertical row adjacent to the one vertical row are staggered in the tire circumferential direction, the sipe units are arranged in a straight line, in the tire width direction or at an inclination angle of 30° or less with respect to the tire width direction, to form a horizontal row,
when a distance in the tire width direction between connection points of the sipe units adjacent to each other in one of the horizontal rows is b, and a clearance distance in the tire circumferential direction between the connection point of the sipe unit in the one vertical row and the connection point of the sipe unit in the adjacent vertical row is c, the following is satisfied:

$$0 \le c/b \le 1.0.$$

* * * * *